United States Patent [19]
Hayes

[11] Patent Number: 5,808,472
[45] Date of Patent: Sep. 15, 1998

[54] APPARATUS AND METHODS FOR POSITIONING OPTICAL FIBERS AND OTHER RESILIENT MEMBERS

[75] Inventor: Robert R. Hayes, Calabasas, Calif.

[73] Assignee: Hughes Electronics Corporation, El Segundo, Calif.

[21] Appl. No.: 718,079

[22] Filed: Sep. 17, 1996

[51] Int. Cl.$^6$ ............................ G01R 27/26; G02F 1/295
[52] U.S. Cl. ................. 324/671; 324/661; 385/4
[58] Field of Search ............................ 324/671; 455/600; 350/96; 356/399; 33/180

[56] References Cited

U.S. PATENT DOCUMENTS

| | | | |
|---|---|---|---|
| 4,474,469 | 10/1984 | Abe | 356/399 |
| 4,520,570 | 6/1985 | Bednorz | 33/180 |
| 4,651,343 | 3/1987 | Laor | 455/600 |
| 4,721,354 | 1/1988 | Kaspar | 350/96 |

OTHER PUBLICATIONS

Tippens, Applied Physics, Mc–Graw–Hill Book Co., Third Edition, p. 590–591, 1985.
Lambert, Stephen G., et al., *Laser Communications in Space*, Artech House, Norwood, MA., 1995, pp. 219–222.

Primary Examiner—Vinh P. Nguyen
Assistant Examiner—Thomas Vazone
Attorney, Agent, or Firm—V. D. Duraiswamy; M. W. Sales

[57] ABSTRACT

A positioning apparatus positions free ends of resilient members. The apparatus couples a capacitance member to the free end and places the capacitance member within an electrode system. A voltage source applies an electric charge to the capacitance member and voltage signals applied to the electrode system generate electric fields which urge the free end to a position of equilibrium between an urging force of said electric field on said electric charge and an internal restoring force of said resilient member. This apparatus is adapted to also be a position sensing apparatus which includes a time-variable signal generator that is coupled to the capacitance member and a current sensor that senses current magnitudes in the electrodes of the electrode system. Each current magnitude is representative of the distance between that electrode and the capacitance member. The positioning apparatus and the position sensing apparatus are incorporated into positioning systems which track a light beam with the free end of an optical fiber.

25 Claims, 8 Drawing Sheets

APPARATUS AND METHODS FOR POSITIONING OPTICAL FIBERS AND OTHER RESILIENT MEMBERS

BACKGROUND OF THE INVENTION

1. Field of the Invention

The present invention relates generally to resilient member positioning systems and more particularly to their use in satellite communication systems.

2. Description of the Related Art

Figure 1:
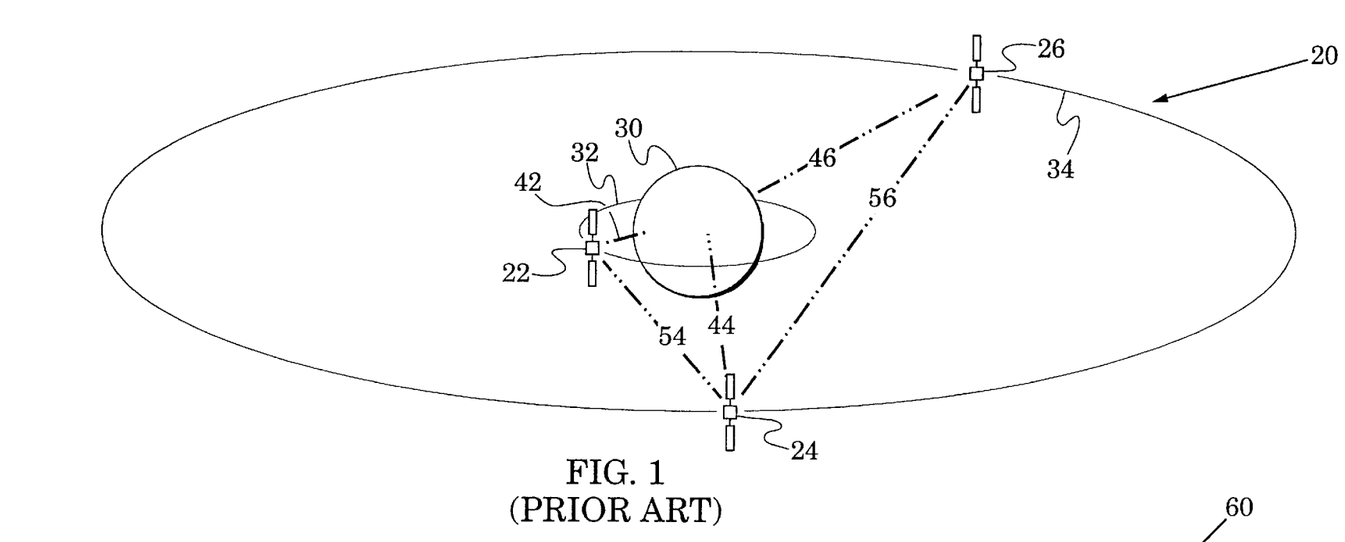
FIG. 1 is a perspective view of Earth satellites and of exemplary communication links between the satellites.

An exemplary satellite communication system 20 is illustrated in FIG. 1. The system includes three satellites 22, 24 and 26 which are in orbit about the Earth 30. The satellite 22 is in a low Earth orbit (LOE) 32 and the satellites 24 and 26 are in a geostationary Earth orbit (GEO) 34. A typical radius of the LOE 32 is a few hundred kilometers and a typical orbit period for the satellite 22 in the LEO 32 is ninety minutes. The radius of the GEO 34 is ~35,786 kilometers and the orbital period of the satellites 24 and 26 is matched to the Earth's rotational period.

The satellites 22, 24 and 26 have respective up-down communication links 42, 44 and 46 which couple them to Earth communication stations. A typical mission of the satellite 26 is the gathering of data (e.g., agricultural, geological or military data). The gathered data can be communicated to its respective ground station each time the LOE orbit of the satellite 22 brings it within view of its respective ground station. Alternatively, the collected data can be relayed through communication crosslinks 54 and 56 to the satellites 24 and 26 and, from these satellites, to their respective ground stations. Without the crosslinks, the satellite 22 must store all its data until its respective ground station comes into view.

Laser radiation wavelengths are thousands of times less than microwave radiation wavelengths. Accordingly, laser radiation has several communication advantages over microwave radiation, e.g., smaller and lower weight antennas, narrower beamwidth, higher gain, and a greater ratio of received power to transmit power. These advantages cause laser radiation to be particularly suited for use in the communication crosslinks 54 and 56 of FIG. 1. Although laser radiation is also used in communication up-down links, (e.g., the links 42, 44 and 46 of FIG. 1), its advantages are reduced in these links because of the high laser attenuation of the Earth's clouds.

Figure 2:
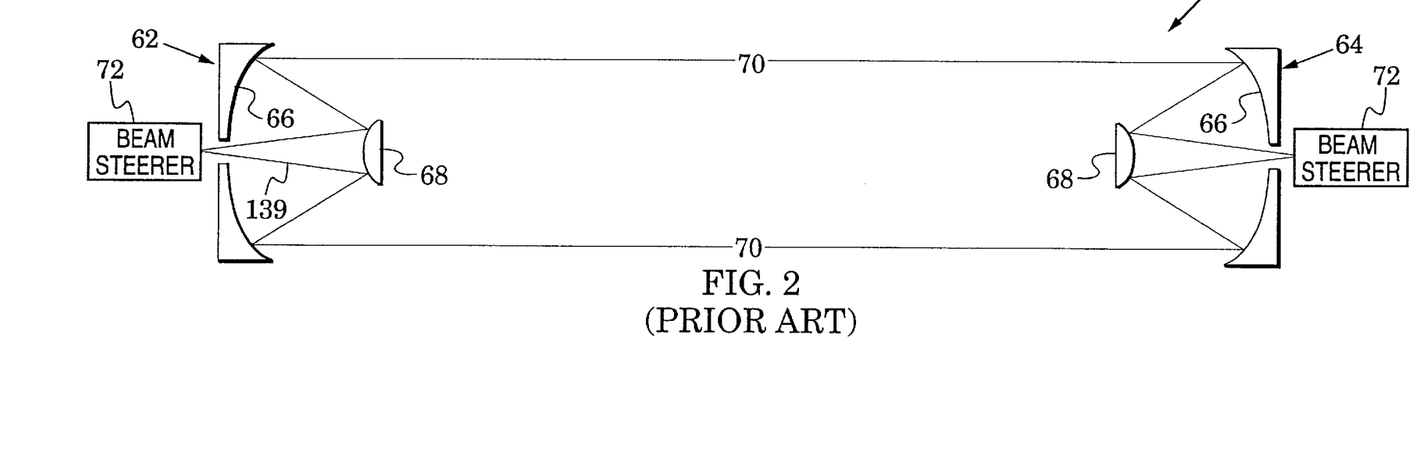
FIG. 2 is a view of a telescope optical link which is conventionally used in the communication links of FIG. 1.

Because of the optical nature of laser radiation, antennas in laser communication systems are generally realized as telescopes which are configured in a variety of conventional designs such as Newtonian, Gregorian, Cassegrain and Schmidt-Cassegrain. For example, FIG. 2 illustrates a telescope optical link 60 which is typically used for coupling laser signals over the communication crosslinks 54 and 56 of FIG. 1. The optical link 60 includes a pair of Cassegrain telescopes 62 and 64 that each have a paraboloidal concave primary mirror 66 in association with a hyperboloidal convex secondary mirror 68. Laser energy 70 passes between the telescopes 62 and 64 and is typically coupled from them to an optical steering element in the form of a beamsteerer 72.

In a typical sequence for establishing the optical link, the telescope 62 is coarsely pointed with the aid of ephemeris and attitude data (data relating to observed positions of celestial bodies). This coarse pointing facilitates inital acquisition of transmit signals by the telescopes at each end of the link.

Once acquisition has been realized, coarse and fine tracking loops are closed through the beamsteerers 72 to maintain the optical link by countering disturbances that are generated from a variety of spacecraft sources, e.g., gimbal jitter, momentum wheels, thrusters, solar array drives and payload mechanisms. The coarse tracking loop typically controls a telescope gimbal with a low loop bandwidth (e.g., 5–10 Hz) to remove low-frequency, high-amplitude disturbances and the fine tracking loop 108 typically controls steering elements in the beam steerer with a higher loop bandwidth (e.g., 100–1000 Hz) to remove high-frequency, low-amplitude disturbances.

As described in various references (e.g., Lambert, Stephen G., et al., *Laser Communications in Space*, Artech House, Norwood, Mass., 1995, pp. 219–222) beamsteerers typically reflect light from directive optical elements, e.g., mirrors and prisms, which are mechanically positioned by electrically-responsive drivers, e.g., galvanometer drivers and piezoelectric drivers. Nonreflective beemsteerers include acousto-optic devices which deflect light beams with acoustic fields that are established in crystals by the application of high voltages.

Although beamsteerers are conventionally employed in satellite crosslinks, they have several features, e.g., complexity, large size and weight, large inertial mass, high cost and high drive power requirement) which detract from their usefulness in systems where size, weight and power use are at a premium.

SUMMARY OF THE INVENTION

The present invention is directed to apparatus and methods for positioning and sensing the position of resilient members. In various embodiments, the teachings of the invention are applied to the positioning of a free end of an optical fiber. In particular, the fiber's free end is caused to track the focal plane image of a received light beam, thereby enhancing the magnitude of the light intercepted by the free end and coupled to a fixed end of the fiber. In addition to light signal reception, the invention's teachings can also direct the transmission of light signals because a light signal injected into the fiber's fixed end will be transmitted in the direction determined by the fiber's free end.

In these embodiments, apparatus of the invention are particularly attractive for replacing conventional beamsteerers in satellite communication systems. In contrast with beemsteerers, apparatus of the invention have low inertial mass, can operate with low drive power and are small, lightweight, simple, and inexpensive.

These goals are achieved by applying an electric charge to a free end of a resilient member and orienting at least one electric field across the free end to urge the free end to a position where the electric field's force on the electric charge and an internal restoring force of the resilient member are in equilibrium. The electric charge is realized by carrying a capacitance member about the free end and coupling a charge voltage to the capacitance member. The electric field is established by coupling at least one voltage to a set of electrodes surrounding the free end.

The position of the capacitance member (and, thus, the position of the free end) is sensed by applying a time-varying electric charge to the capacitance member and sensing, from each of the surrounding electrodes, the magnitude of a time-varying current flowing through that electrode; this current magnitude is a function of the distance between that electrode and the capacitance member.

Positioning and position sensing apparatus which incorporate these concepts are combined with optical detectors and synchronous detectors to form positioning systems which cause a free end of a resilient optical fiber to track a light beam.

The novel features of the invention are set forth with particularity in the appended claims. The invention will be best understood from the following description when read in conjunction with the accompanying drawings.

DETAILED DESCRIPTION OF THE PREFERRED EMBODIMENTS

Figure 3:
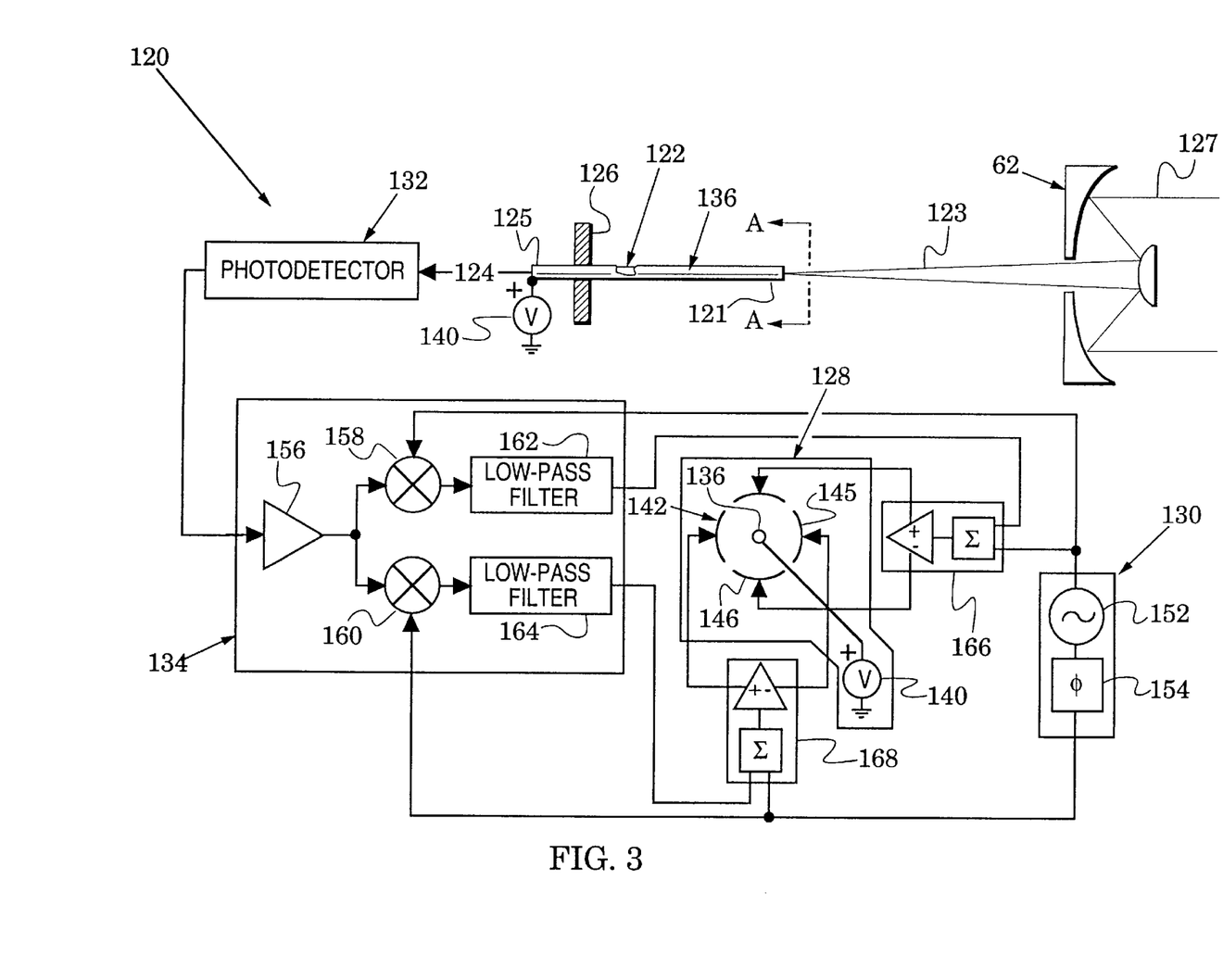
FIG. 3 is a block diagram, in accordance with the present invention, of an optical fiber positioning system which is particularly suited for use in the optical link of FIG. 2.

FIG. 3 illustrates an optical fiber positioning system 120 which causes a free end 121 of a resilient optical fiber 122 to track the focal plane image of a focused light beam 123, and thereby enhance the magnitude of the light beam portion 124 intercepted by and coupled into the free end of the fiber, and conducted to the fiber's fixed end 125 which extends beyond a fiber mounting member 126. In an exemplary application of the positioning system 120 to a satellite communication system, the focused light beam 123 is generated from an external light beam 127 by the telescope 62 (of FIG. 2).

The positioning system 120 includes a positioning apparatus 128, a quadrature generator 130, a photodetector 132 and a synchronous detector 134. The fiber's fixed end 125 is optically coupled to the photodetector 132 and the fiber's free end 121 lies within an electrode system of the positioning apparatus 128. For clarity, a detailed description of the positioning system 120 and its operation is preceded by the following description of the positioning apparatus.

The positioning apparatus 128 has a capacitance member in the form of a conductive sleeve 136 which covers the optical fiber 122 and is thus configured to receive and store an electric charge. The conductive sleeve 136 is preferably formed by a layer of metal, e.g., silver, that is deposited by an appropriate process, e.g., electroplating, over the optical fiber 122. In FIG. 3, the sleeve 136 is shown twice. It is first shown in a side view in association with the optical fiber 122 where the sleeve 136 is broken away to expose the underlying optical fiber. It is shown again in the positioning apparatus 128. In the positioning apparatus, it is illustrated as its end would appear along the plane A—A adjacent the free end 121 of the optical fiber 122.

The positioning apparatus 128 also includes a voltage source 140 which is coupled to the sleeve 136 and an electrode set or system 142. The voltage source 140 is preferably coupled to the fixed end 125 as shown in association with the side view of the sleeve 136. The positioning apparatus 128 is also illustrated in the enlarged view of FIG. 4 where the sleeve 136 and the free end 121 are spaced apart for clarity of illustration. As shown in this view, the electrode system 142 includes four electrodes 144A–144D which are arranged so that each subtends substantially a quadrant about the free end 121. In particular, electrodes 144A and 144B are spaced horizontally from the free end 121 to form an electrode pair 145 and electrodes 144C and 144D are spaced vertically from the free end 121 to form an electrode pair 146. The electrode pairs 145 and 146 are thus arranged in a mutually-orthogonal relationship.

Figure 4:
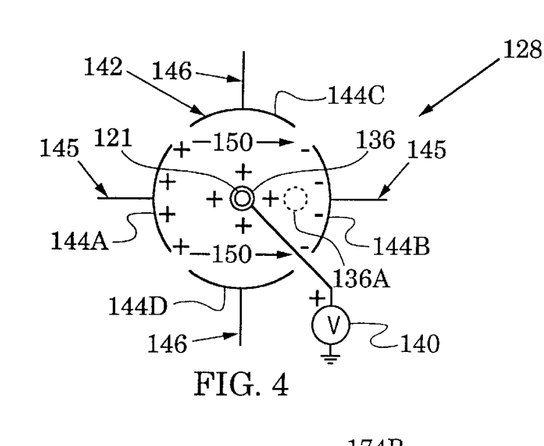
FIG. 4 is an enlarged view of a resilient member positioning apparatus in the positioning system of FIG. 3.

To illustrate the operation of the positioning apparatus 128, the voltage source 140 is oriented to place a positive charge on the sleeve 136 and the electrode 144A is shown to be biased positive relative to the electrode 144B by a control voltage. In response, the electrodes 144A and 144B generate an electric field 150 across the sleeve 136 and its electric charge. This electric field induces a force upon the positive charge which urges it and the sleeve 136 (and therefore the free end 121) horizontally towards the electrode 144B to a position 136A. The position 136A is that position where the urging force of the electric field 150 on the electric charge in the sleeve 136 equals a restoring force of the resilient optical fiber (122 in FIG. 3).

In a similar manner, an electric bias across the vertically-spaced electrodes 144C and 144D will generate an electric field that will urge the free end 121 vertically to a position where the urging force of the electric field equals a restoring force of the resilient optical fiber. In general, the positioning apparatus 128 operates to position the free end of a resilient member (e.g., the optical fiber 122) by applying an electric charge onto the free end and orienting at least one electric field across the free end to urge it to a position where an urging force of the electric field on the electric charge equals a restoring force of the resilient member.

Attention is now redirected to the positioning system 120 and its other main elements, i.e., the quadrature generator 130, the photodetector 132 and the synchronous detector 134. The quadrature generator 130 is configured to provide two dither signals which are phase offset from each other by substantially ninety degrees. In the embodiment of FIG. 3, the quadrature generator 130 includes a generator 152 in series with a ninety degree phase shifter 154. Other quadrature generator embodiments can be substituted (e.g., first and second generators which are locked in a phase quadrature relationship by a phase-lock circuit).

The output of the photodetector 132 is coupled to the synchronous detector 124. The photodetector can be any optical detector, e.g., a photoconductor or a photodiode, which converts incident photon flux into an output electric signal.

The synchronous detector 134 includes an input amplifier 156 which is coupled through a pair of phase detectors 158 and 160 (exemplary phase detectors include mixers and switches, e.g., CMOS switches) to a pair of low-pass filters 162 and 164 respectively.

The output of the generator 152 and the output of the low-pass filter 162 are summed and coupled to the vertically-spaced electrode pair 146 through a summer/differential amplifier 166. The output of the generator 152 is also coupled to a reference port of the phase detector 158. Similarly, the output of the phase shifter 154 and the output of the low-pass filter 164 are summed and coupled to the horizontally-spaced electrode pair 145 through a summer/differential amplifier 168. The output of the phase shifter 154 is also coupled to a reference port of the phase detector 160.

In operation of the optical fiber positioning system 120, the outputs of the generator 152 and the phase shifter 154 apply dither signals respectively to the vertically-spaced electrode pair 146 and the horizontally-spaced electrode pair 145. Because these signals have a phase-quadrature relationship, the free end 121 is driven in a circular pattern over the incident laser beam 123. The radiation portion 124 which is consequently received by the free end 121 and conducted to the fixed end 125 can be described by observing the movement of the free end 121 in an exemplary one of horizontal and vertical planes through the laser beam 123.

Figures 5, 6:
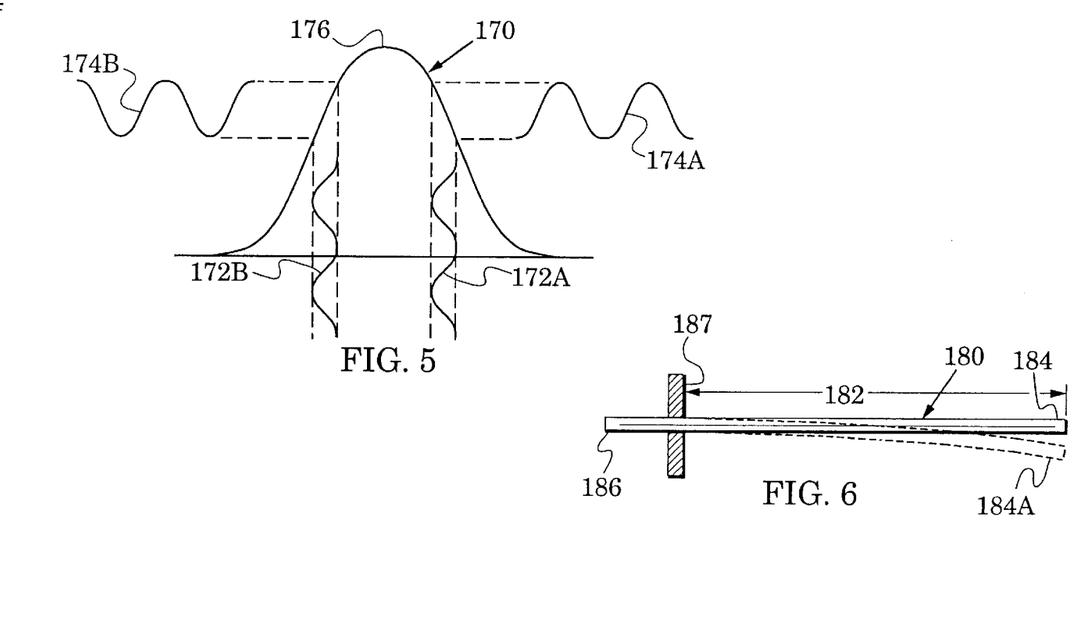
FIG. 5 is a graph of a laser beam's light intensity which illustrates the relationship of search signals and detected signals in the positioning system of FIG. 3.
FIG. 6 is a side view of a resilient member having a free end which can be positioned by the positioning apparatus of FIG. 4.

Accordingly, FIG. 5 illustrates an intensity profile 170 of the laser beam 123 along a horizontal plane in which it is assumed that the beam's energy has a Gaussian distribution. If the drive signal from the phase shifter 154 is sinusoidal, the free end 121 will be deflected sinusoidally in the horizontal plane. This deflection is indicated by the deflection curve 172A in which it is assumed that the free end 121 is initially positioned to the right of the laser beam's intensity peak 176. With this assumption, the detected signal from the photodetector 132 will be the response projection 174A that is described by the intersection of the deflection curve 172A and the intensity profile 170.

In contrast, deflection curve 172B indicates the same deflection of the free end 121 when it is assumed that the free end 124 is initially positioned to the left of the laser beam's intensity peak 176. With this assumption, the detected signal from the photodetector 132 will be the response projection 174B that is described by the intersection of the deflection curve 172B and the intensity profile 170.

The detected signals 174A and 174B are 180° out of phase and when they are synchronously detected by the phase detector 160 and filtered through the low-pass filter 164 they will develop opposite polarity position-correction signals. By applying the feedback signal from the low-pass filter 164 to the horizontally-spaced electrode pair 145, the free end 121 will be urged to the peak 176 of the intensity profile 170. In a similar manner, position-correction feedback signals from the low-pass filter 162 will vertically urge the free end 121 to the peak of the intensity profile 170 of the laser beam 123.

Thus, the positioning system 120 constantly directs the free end 121 through a circular pattern and, with position-correction feedback through the synchronous detector 134, urges the free end 121 to the laser intensity peak 176. With the aid of the positioning apparatus 128, the positioning system 120 tracks the light beam 123 by detecting the light beam portion 124 which is conducted to the fixed end 125 and adjusting the magnitude of the electric fields applied to the electrode system 142 to maximize the light beam portion.

Although the generator 130 has been described to generate quadrature signals which urge the free end 121 in a circular pattern, other signal relationships can be used to modify the pattern of the free end 121 to enhance its detection sensitivity.

The positioning system 120 has been described with reference to the positioning of the free end of an optical fiber. However, the teachings of the invention can be applied to the positioning of any resilient member that can be adapted to carry a capacitance member. FIG. 6 illustrates a resilient member 180 with a free end 184 and a fixed end 186 which extends through a mounting member 187. The resilient member has a length 182 between the free end 184 and the mounting member 187. The free end 184 carries a capacitance member and has a rest position (shown in solid lines) when no field is applied and a deflected position 184A (shown in broken lines) after the application of a downward-directed electric field. The modes of vibration of such a resilient member have been determined to have frequencies of $$\omega_n = \frac{\epsilon_n^2}{l^2} \sqrt{\frac{k_o}{\rho}} \qquad (1)$$

in which 1 is the length 182, $k_o$ is the spring constant of the resilient member 180, $\rho$ is the mass per unit length and $\epsilon_n$ are the eigenvalues of table 1.

TABLE 1

| n | $\epsilon_n$ |
|---|---|
| 0 | 1.87 |
| 1 | 4.69 |
| 2 | 7.85 |
| 3 | 10.99 |

Figure 7A:
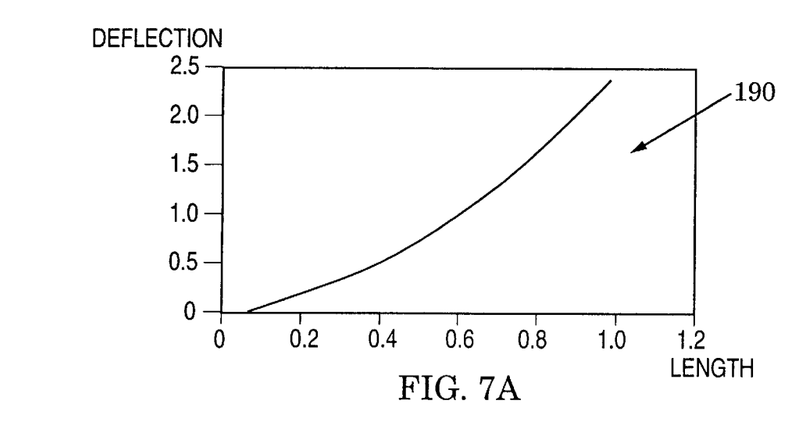
FIGS. 7A and 7B are graphs which illustrate displacement as a function of length for two vibration modes of the resilient member of FIG. 6.
Figure 7B:
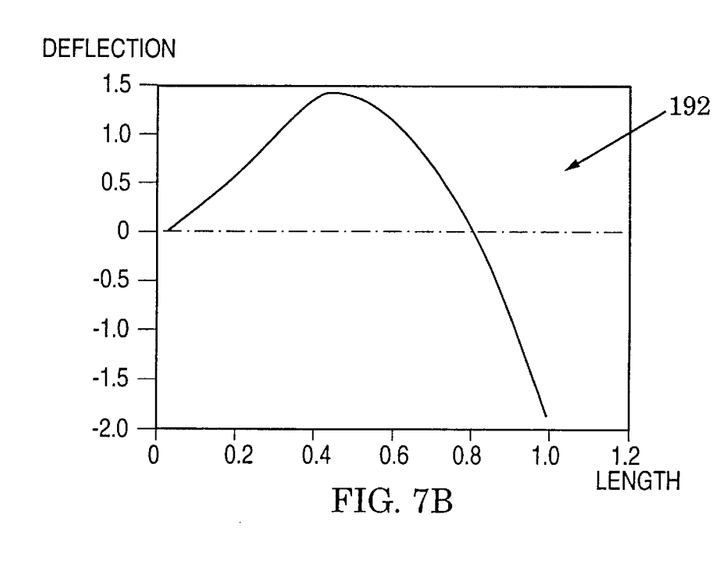

Equation (1) states that the frequency decreases as the square of the member's length 182 for all vibration modes. FIGS. 7A and 7B are graphs 190 and 192 of the displacement of the resilient member 180 as a function of its length 182 when the member vibrates respectively in its fundamental mode and next highest mode. As an example of the frequency dependance of resilient members upon their length, the measured frequency dependance as a function of length is shown in Table 2 for an exemplary optical fiber.

TABLE 2

| length (mm) | frequency (Hz) |
|---|---|
| 43 | 50 |
| 30 | 109 |
| 20 | 245 |
| 15 | 424 |
| 10 | 793 |

Preferably, the positioning system 120 of FIG. 3 is operated below the resonant frequency of any resilient member that it is associated with. In general, higher resonant frequencies enhance the system's ability to reduce the effect of external vibrations but reduces the system's deflection sensitivity.

As described above with reference to FIG. 4, an electric field 150 between the electrodes 144A and 144B urges a positively charged capacitance member 136 towards the electrode 144B. The deflection of the free end 121 is proportional to the charge on the free end's capacitance member, proportional to the electric field 150 and inversely proportional to the effective spring constant of the resilient member. The effective spring constant decreases as the cube of the length of the resilient member. The charge that a cylindrical capacitance member acquires can be conventionally calculated.

The resilient member and electrode system of FIG. 4 is similar to that of a free-floating wire in a coaxial capacitor. When charged, such a wire sees a radial force which is directed outward. The force on the wire is zero when it is at the center and the force increases linearly with distance from the center. Such a wire is therefore in a position of unstable equilibrium and will snap to the outer conductor if there is no restoring force. In the case of a resilient member within an electrode system 142 as shown in FIG. 4, the effective spring constant of the resilient member counteracts this destabilizing force and holds the member at the center of the electrode system 142.

However, if the charge voltage (from the charge voltage source 140 of FIG. 3) is increased past a critical voltage, the destabilizing force exceeds the restoring force of the resilient member and the member again is snapped to the electrode system. When the voltage is maintained below the critical voltage, the resilient member remains at the center of the electrode system (assuming zero deflection voltage) but has a reduced effective spring constant. As the charge voltage is increased past the critical voltage, this effective spring constant goes through zero and changes sign whereupon the member is snapped to the electrode system.

For the positioning system 120 of FIG. 3, it has been found that operation is enhanced by operating with a charge voltage (140 in FIG. 3) that is approximately one half the critical voltage. At this operating point, it has been found that the fiber deflection sensitivity is sufficient and the resonant frequency is only reduced by approximately 13%. Table 3 shows deflection sensitivity and resonant frequency as a function of length for exemplary optical fibers.

TABLE 3

| length (mm) | sensitivity ($\mu$m/V) | $f_{resonance}$ (Hz) |
|---|---|---|
| 15 | 0.45 | 355 |
| 20 | 0.79 | 200 |
| 25 | 1.25 | 128 |
| 30 | 1.79 | 89 |

As shown in FIGS. 4 and 5, the electrode system 142 has a structure of a segmented cylinder. It has been found that various electrode configurations can successfully apply the deflection voltages of the positioning system. Exemplary electrode system embodiments 200, 202, 204 and 206 are respectively illustrated in FIGS. 8A, 8B, 8C and 8D.

Figure 8A:
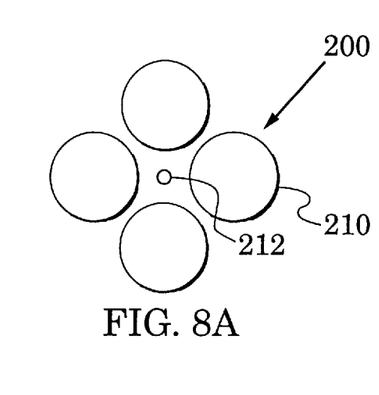
FIGS. 8A–8D are end views of exemplary electrode systems for use in the positioning apparatus of FIG. 4.
Figure 8B:
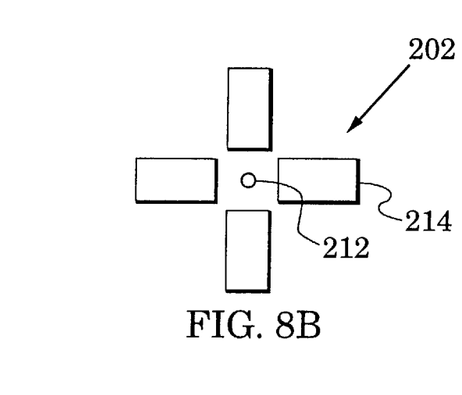

The electrode system 200 has four cylindrical electrodes 210 formed from a metal, e.g., copper, and arranged to each substantially subtend a quadrant about the free end 212 of a resilient member. The electrode system 202 is similar to the electrode system 200 but has rectangular electrodes 214 in place of the cylindrical electrodes 210. The rectangular electrodes are arranged to each have a face substantially subtend a quadrant about the free end 212.

Figure 8C:
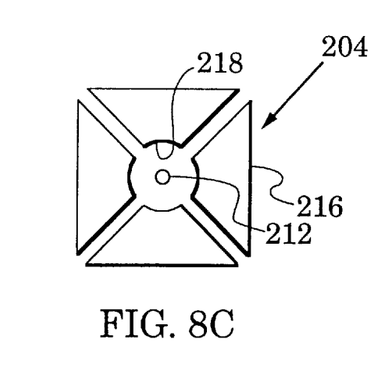
Figure 8D:
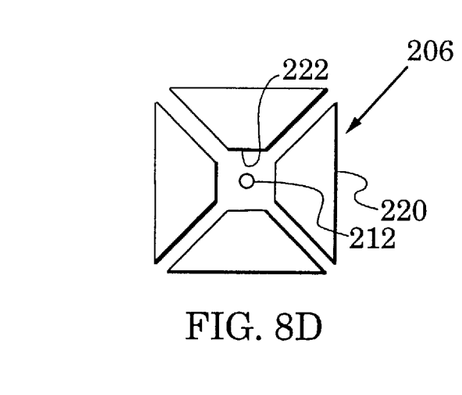

The electrode system 204 has four electrodes 216 which are arranged to each substantially subtend a quadrant about the free end 212. The inner surface of the electrodes 216 are shaped to substantially define a circular aperture 218 which receives the free end 212. The electrode system 206 is similar to the electrode system 204 but has electrodes 220 whose inner surfaces are shaped to substantially define a square aperture 222 which receives the free end 212.

Figure 9:
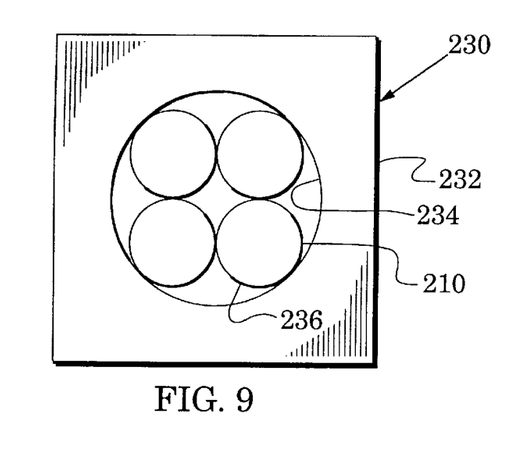
FIG. 9 is an end view of another exemplary electrode system for use in the positioning apparatus of FIG. 4.

FIG. 9 illustrates an adaptation 230 of the electrode system 200 of FIG. 8A which is especially suited for low-cost fabrication. It has a support member 232 which is shaped to form a passage 234. Each of the cylindrical electrodes 210 of FIG. 8A are covered with a coat 236 of an insulative material (e.g., an insulative paint) and received into the passage 234 with each of the electrodes 210 abutting its neighbors. To hold the electrodes 210 in place, the support member 232 is preferably formed of a resilient material such as a flouroplastic (e.g., as manufactured under the trademark Teflon by E. I. du Pont de Nemours & Company).

Figure 10:
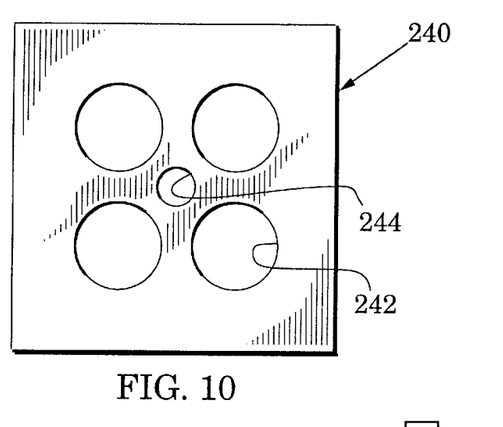
FIG. 10 is an end view of an electrode support member for use in the positioning apparatus of FIG. 4.

FIG. 10 illustrates a support member 240 which can enhance the low-cost fabrication of the electrode system 200 of FIG. 8A. The support member 240 is shaped to form passages 242 which can each receive one of the cylindrical electrodes 210 and shaped to form a centrally-located passage 244 which can receive the free end 212. The passage 244 is dimensioned to permit the operational deflection of the free end 212.

Figure 11:
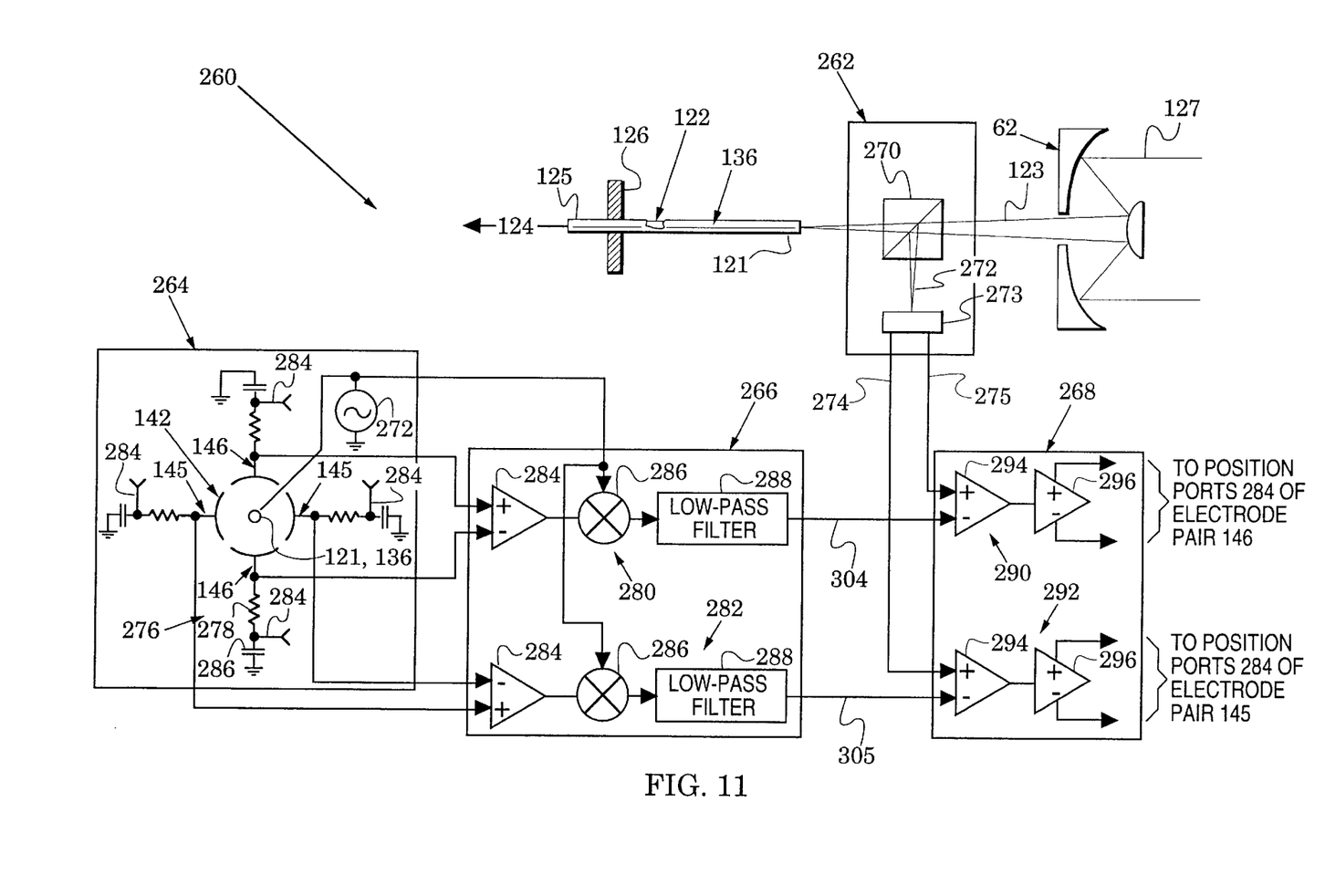
FIG. 11 is a block diagram of another optical fiber positioning system.

FIG. 11 illustrates another optical fiber positioning system 260 which causes a free end 121 of a resilient optical fiber 122 to track a light beam 123 and thereby enhance the magnitude of a light beam portion 124 which is conducted to a fixed end 125 of the optical fiber (similar to the positioning system 120 of FIG. 3, the light beam 123 can originate in the telescope 62 of FIG. 2). The positioning system 260 includes an optical detector system 262, a positioning and position sensing apparatus 264, a synchronous detector 266 and a difference system 268.

The fiber's free end 121 lies within an electrode system 142 of the positioning and position sensing apparatus 264. For clarity, a detailed description of the system 260 and its operation is preceded by the following description of the apparatus 264 which is separately illustrated in the enlarged view of FIG. 12.

Figure 12:
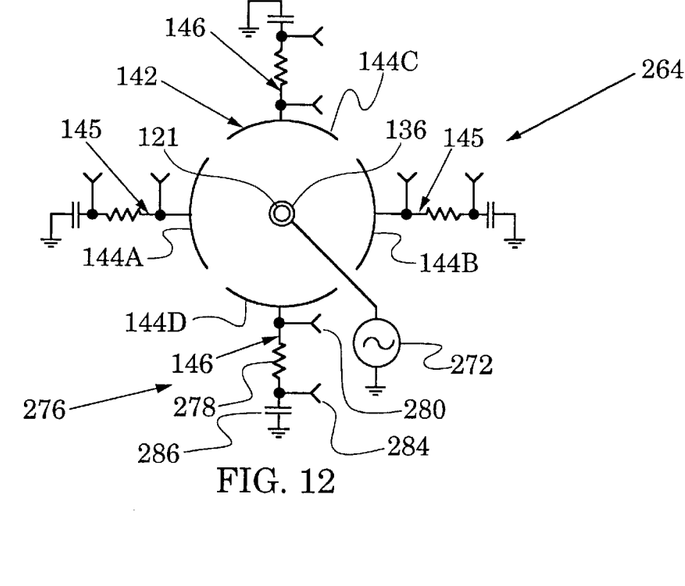
FIG. 12 is an enlarged view of a resilient member positioning and position sensing apparatus in the positioning system of FIG. 11.

The positioning and position sensing apparatus 264 is similar to the positioning apparatus 128 of FIG. 4 with like elements indicated by like reference numbers. However, the voltage source 140 of the positioning apparatus 128 is replaced by a signal generator 272 which applies a time-varying voltage to the sleeve 136. Thus, the capacitive sleeve 136 takes on a time-varying electric charge and the electrodes of the electrode system 142 take on a time-varying charge whose instantaneous sign is opposite the instantaneous sign of the charge on the sleeve 136.

Consequently, a time-varying current flows through sleeve 136, the electrode system 142 and the signal generator 272. The magnitude of the current through any given electrode, (e.g., the electrode 144D) is a function of the capacitance between the sleeve 136 and that electrode. Therefore, the magnitude of the current through any given electrode is a function of the distance between the sleeve 136 and that electrode. For example, if the sleeve 136 were to approach the electrode 144D the capacitance between them would increase and, accordingly, the time varying current through the electrode 144D also increases and provides a measure of the instantaneous distance between these two elements.

The currents through the electrodes of the electrode system 142 are sensed with a current sensor 276 in the form of resistors 278 which are each arranged in series with a respective one of the electrodes. A sense port 280 between each electrode and its respective one of the resistors 278 provides a time-varying voltage which is representative of the distance between the sleeve 136 (and, therefore, the fiber's free end 121) and that sense port's respective electrode.

Although the positioning and position sensing apparatus 264 senses the position of a resilient member's free end (e.g., the free end 121 of FIG. 11), it also functions to position that free end in a manner similar to that of the positioning apparatus 128 of FIG. 4. Accordingly, a position voltage port 284 is provided on another side of each of the resistors 278. Each position voltage port 284 is isolated from ground by a respective isolation capacitor 286 (for clarity of illustration, reference numbers of the resistors 276, isolation capacitors 286 and ports 280 and 284 are shown only at an exemplary electrode 144D).

In operation of the positioning and position sensing apparatus 264, the position of the free end 121 is controlled by application of suitable positioning signals on the position voltage ports 284 and the instantaneous position of the free end 121 is sensed by time-varying voltages which are accessed at the sense ports 280. In general, the apparatus 264 operates to sense the position of a resilient member's free end (e.g., the free end 121 of FIG. 12) by applying a time-varying electric charge across the free end and an electrode system and sensing, from each of the electrodes of the electrode system, the magnitude of a time-varying current flowing through that electrode.

Attention is now redirected to the positioning system 260 and its other main elements, i.e., the optical detector system 262, the synchronous detector 266 and the difference system 268.

The optical detector system 262 includes a conventional beamsplitter 270 (e.g., a semireflecting metallic or dielectric film or a pair of prisms configured to split incident signals by frustrated total reflection between the prisms) which couples a light beam sample 272 from the light beam 123. The optical detector system 262 also includes a spatial-position optical detector 273 (e.g., a photopot) which provides signals that are representative of the spatial position of a light source. The detector 273 responds to the light beam sample 272 by generating first and second light beam position signals 274 and 275 which are representative of the spatial position of the light beam 123 along first and second orthogonal planes (e.g., horizontal and vertical planes).

The synchronous detector 266 has two channels 280 and 282. Each of the channels includes a series combination of a differential amplifier 284, a phase detector 286 and a low-pass filter 288. A reference port of each of the phase detectors 286 is coupled to the signal generator 272 of the positioning and position sensing apparatus 264.

The difference system 268 also has two channels 290 and 292 which each include a differential amplifier 294 in series with a driver 296 that has a differential output.

The sense ports (280 in FIG. 12) of the electrode pairs 145 and 146 provide time-varying position signals which are representative of the position of the free end 121 along the same first and second orthogonal planes from which the light beam position signals 274 and 275 were derived. These time-varying free end position signals are coupled respectively to the synchronous detector's channels 282 and 280 and the outputs of these channels are respectively coupled to the differential amplifiers of the difference system's channels 292 and 290. The drivers 296 of the difference system's channels 292 and 290 are coupled respectively to the position ports 284 of the electrode pairs 145 and 146.

In operation of the positioning system 260, the optical detector system 262 provides first and second light beam position signals 274 and 275 to the difference system 268. The synchronous detector 266 detects time-varying free end position signals from the positioning and position sensing apparatus 264 and provides first and second free end position signals 304 and 305 to the difference system 268. The difference between these spatial position signals form position-correction signals at the outputs of the drivers 296. These position-correction signals are fed back to the position ports 284 of the positioning and position sensing apparatus 264 to urge the free end 121 to the spatial position of the light beam 123.

For an exemplary optical fiber, the capacitance between the sleeve 136 and an electrode of the electrode system 142 is quite small, e.g., ~1 picofarad. Accordingly, the time-varying signal of the generator 272 is preferably selected to have a frequency, e.g., ~10 MHz, which is sufficient to provide easily measured magnitudes for the time-varying position signals that are coupled between the positioning and position sensing apparatus 264 and the synchronous detector 266. Such a generator frequency also facilitates a feedback bandwidth, e.g., ~1 MHz, which is far beyond the mechanical resonance of the optical fiber.

Figure 13:
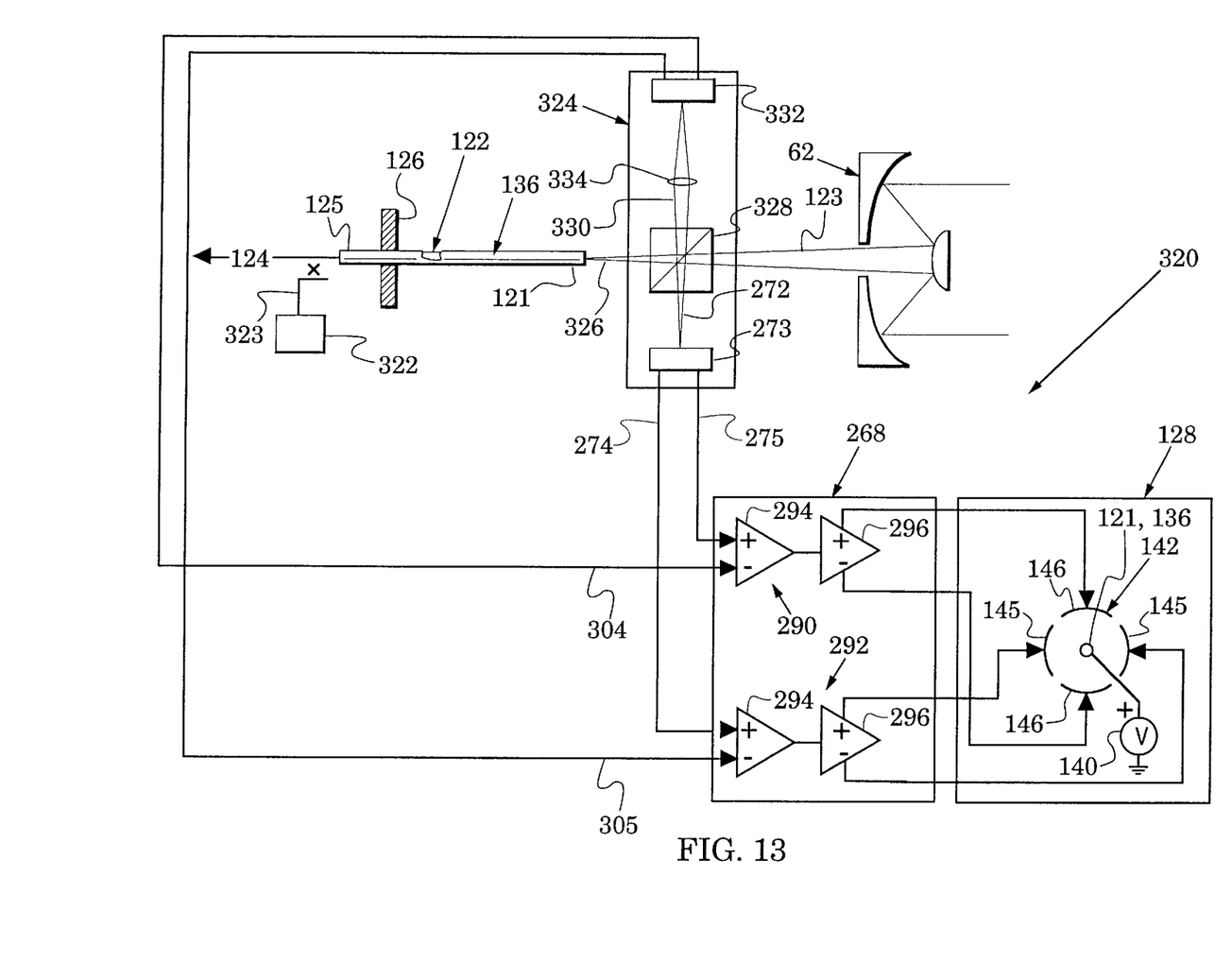
FIG. 13 is a block diagram of another optical fiber positioning system.

In the positioning system 260 of FIG. 11, the positioning and position sensing apparatus 264 and the synchronous detector 266 generate first and second free end position signals 304 and 305. These signals which represent the spatial position of the free end 121, are coupled to the difference system 268 and compared to the first and second light beam position signals 274 and 275 which are generated by the optical detector system 262. In response to these spatial position signals, the difference system 268 sends position-correction signals to electrode pairs 145 and 146 of the positioning and position sensing apparatus 264 FIG. 13 illustrates another positioning system 320 which is similar to the positioning system 260 with like elements indicated by like reference numbers. However, the first and second free end position signals 304 and 305 are generated by an optical signal generator 322 and an optical detector system 324 and the position-correction signals of the difference system 268 are sent to a positioning apparatus 128 which was described above in relation to FIGS. 4 and 5.

The optical signal generator 322 (e.g., a laser or a light-emitting diode) generates an optical signal which is coupled into the fixed end 125 of the optical fiber 122 and is radiated from the free end 121 as a free end light beam 326. The optical detector system 324 is similar to the optical detector system 262 of FIG. 11 but it has a bidirectional beamsplitter 328 which couples a light beam sample 272 from the light beam 123 and a free end light beam sample 330 from the free end light beam 326.

The optical detector system 324 also includes another spatial-position optical detector 332 which responds to the free end light beam sample 330 and provides the free end position signals 304 and 305 to the difference system 268. Because the light beam from the free end 121 is divergent, a focusing element in the form of a lens 334 is located to focus the free end light beam sample 330 onto the spatial optical detector 332.

The output of the drivers 296 of the difference system's channels 290 and 292 are coupled respectively to the electrode pairs 146 and 147 of the positioning apparatus 128.

In operation of the positioning system 320, the optical detector system 324 provides first and second light beam position signals 274 and 275 to the difference system 268 and also provides first and second free end position signals 304 and 305 to the difference system 268. The difference between these spatial position signals form position-correction signals at the outputs of the drivers 296 of the difference system 268. These position-correction signals are fed back to the electrode pairs 145 and 146 of the positioning apparatus 128 to urge the free end 121 to the spatial position of the light beam 123.

The spatial-position optical detectors 273 and 332 of the optical detector system 324 may be configured to respond to different optical wavelengths to reduce crosstalk interference in the positioning system 320. In an exemplary system, the wavelength of the light beam 123 from the telescope 62 may be on the order of 1.55 microns. To reduce interference, the wavelength of the free end light beam 326 from the optical signal generator 322 can be selected to be on the order of 0.98 microns. In this exemplary configuration, the detectors 273 and 332 can be fabricated respectively with germanium and silicon semiconductor structures which are inherently responsive at these different wavelengths.

Positioning and position sensing apparatus of the invention facilitate the positioning of flexible members and the sensing of the positions of those members. Although an exemplary conductive material for the sleeve 126 in the positioning apparatus 128 of FIG. 4 has been given as silver, various conductive materials can be used because the operation of the apparatus is not dependent upon a low-resistivity material.

Positioning systems of the invention which incorporate these apparatus facilitate the tracking of a light beam with the free end of an optical fiber and are especially suited for use in a variety of optical systems, e.g., satellite telescope communication systems, mechanical fiber switches, beam multiplexing devices and fiber optic beam scanners. In a satellite communication system, they can correct alignment errors caused by various disturbances, e.g., turbulent atmosphere and spacecraft vibration.

In addition to their use in light signal reception, the teachings of the invention can also be applied to light signal transmission. For example, light signals can be injected into the fixed end of an optical fiber and transmitted in the direction determined by the fiber's free end which is controlled in accordance with the invention.

Positioning systems of the invention generate and apply position-correction signals. When used by those skilled in the feedback art, these systems may be adapted with conventional feedback techniques. For example, feedback theory addresses the controlled movement of an object, e.g., a fiber end, from an actual position to a desired position. This theory typically sums three signals: a first signal proportional to the desired position, a second signal proportional to the difference between the actual and the desired position and a third signal which is proportional to the time derivative of the actual position. The second signal applies a restoring force that repositions the fiber end to the desired location and the third signal damps out undesired motions of the fiber.

An analysis has shown that the fractional error in the position of the fiber end for a system that applies these signals is given by $$\frac{x_{desired} - x_{actual}}{x_{desired}} = \frac{\omega_r^2 - \omega^2 + j\omega\omega_r/Q_e}{g\omega_r^2 - \omega^2 + j\omega\omega_r/Q_e} \quad (2)$$

in which $\omega_r$ is the resonant frequency of the fiber, $\omega$ is the frequency of the motion of the desired position, $Q_e$ is the "effective" mechanical Q, and g is the dynamic gain of the system. It can be observed that the error in equation (2) becomes a minimum at the resonant frequency of the fiber. Electronic damping allows one to make $Q_e$ as small as desired. This reduces the effects of external mechanical vibration at some cost in positional accuracy. However, by making g sufficiently large one can generally move the effective resonant frequency above that of any anticipated vibration so that the amount of required damping is reduced.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A positioning system for causing a first end of a resilient optical fiber to track a light beam and thereby enhance the magnitude of a light beam portion which is conducted to a second end of said optical fiber, comprising:
    a positioning apparatus which includes:
        a) a capacitance member coupled to said first end and configured to receive an electric charge; and
        b) a set of electrodes arranged about, spaced from and unattached to said capacitance member;
    a signal generator that generates a time-varying dither signal which is coupled to said electrode set to urge said first end along a dither pattern;
    an optical detector coupled to said second end to generate a detected signal in response to the magnitude of said light beam portion; and
    a synchronous detector which couples position-correction signals to said electrode set in response to said detected signal.

2. The positioning system of claim 1, wherein said synchronous detector includes a low-pass filter system for attenuating time-varying components of said position-correction signal.

3. The positioning system of claim 1, wherein:
    said signal generator is configured to generate first and second dither signals having a phase-quadrature relationship;
    said electrode set includes orthogonally-arranged first and second electrode pairs which are respectively coupled to said first and second dither signals;
    said synchronous detector includes first and second phase detectors which are respectively responsive to said first and second dither signals and are each responsive to said detected signal; and
    said low-pass filter system includes a first low-pass filter coupled between said first phase detector and said first electrode pair and a second low-pass filter coupled between said phase detector and said electrode set.

4. The positioning system of claim 1, wherein said first and second phase detectors are each a mixer.

5. The positioning system of claim 1, wherein said first and second phase detectors are each a switch.

6. The positioning system of claim 1, further including a voltage source coupled to said capacitance member to supply said electric charge to said capacitance member.

7. The positioning system of claim 1, wherein said capacitance member is formed by a metallic sleeve about said first end.

8. The positioning system of claim 1, further including a telescope positioned to focus said light beam onto said free end.

9. A positioning system for causing a first end of a resilient optical fiber to track a light beam and thereby enhance the magnitude of a light beam portion which is conducted to a second end of said optical fiber, comprising:
    an optical detector system that, in response to said light beams generates a light beam position signal representative of the position of said light beam;
    a positioning and position sensing apparatus which includes:
        a) a capacitance member coupled to said first end and configured to receive an electric charge;

b) a set of electrodes arranged about, spaced from and unattached to said capacitance member; and c) a current sensor coupled to said electrode set to generate position signals in response to currents from said electrode set which are representative of the distance between said capacitance member and said electrode set;

a signal generator that supplies a time-varying electric charge to said capacitance member;

a synchronous detector which generates, in response to said signal generator and said current sensor, a first end position signal representative of the position of said first end; and a difference system that generates a position-correction voltage signal which is representative of the difference between said first end position signal and said light beam position signal and that to couples said position-correction voltage signal to said electrode set.

10. The positioning system of claim 9, wherein said optical detector system includes:

a beamsplitter system responsive to said light beam for generating a light beam sample; and a photopot responsive to said light beam sample for generating first and second light beam position signals which are representative of the position of said light beam along first and second orthogonal planes.

11. The positioning system of claim 9, wherein said current sensor includes, for each of said electrodes, a resistor coupled to that electrode to generate a time-varying first end position signal in response to a time-varying current whose magnitude is representative of the distance between said first end and that electrode.

12. The positioning system of claim 9, further including a voltage source coupled to said capacitance member to supply said electric charge to said capacitance member.

13. The positioning system of claim 9, wherein said capacitance member is formed by a metallic sleeve about said first end.

14. The positioning system of claim 9, further including a telescope positioned to focus said light beam onto said free end.

15. A positioning system for causing a first end of a resilient optical fiber to track a light beam and thereby enhance the magnitude of a light beam portion which is conducted to a second end of said optical fiber, comprising:

a positioning apparatus which includes:

a) a capacitance member coupled to said first end and configured to receive an electric charge; and b) a set of electrodes arranged about, spaced from and unattached to said capacitance member;

an optical signal generator that couples a reference signal into said second end, said reference signal thereby conducted to and radiated from said first end by said optical fiber;

an optical detector system which, generates, in response to said reference signal and said light beam, a first end position signal and a light beam position signal which are respectively representative of the position of said reference signal and said light beam; and a difference system that generates a position-correction voltage signal which is representative of the difference between said first end position signal and said light beam position signal and that to couples said position-correction voltage signal to said electrode set.

16. The positioning system of claim 15, wherein:

said optical detector system includes:

a) a beamsplitter system responsive to said reference signal and to said light beam for respectively generating a reference signal sample and a light beam sample; and b) first and second photopots respectively responsive to said reference signal sample and said light beam sample for generating first and second first end position signals and first and second light beam position signals which are representative of the position of said first end and said light beam along first and second orthogonal planes;

said electrode set includes orthogonally-arranged first and second electrode pairs; and said difference system includes first and second differential amplifiers with said first differential amplifier responsive to said first end position signal and said first light beam position signal and having its output coupled to said first electrode pair and with said second differential amplifier responsive to said second first end position signal and said second light beam position signal and having its output coupled to said second electrode pair.

17. The positioning system of claim 15, further including a voltage source coupled to said capacitance member to supply said electric charge to said capacitance member.

18. The positioning system of claim 15, wherein said capacitance member is formed by a metallic sleeve about said first end.

19. The positioning system of claim 15, wherein said optical signal generator is a laser.

20. The positioning system of claim 15, wherein said optical signal generator is a light emitting diode.

21. The positioning system of claim 15, further including a telescope positioned to focus said light beam onto said free end.

22. A method of tracking a light beam with a free end of an optical fiber, comprising the steps of:

arranging said light beam to be incident upon said free end;

attaching a capacitance member to said free end;

coupling a voltage to said capacitance member to apply an electric charge to said capacitance member;

orienting at least one electric field across said capacitance member;

detecting a portion of said light beam which is conducted through said optical fiber to another end of said optical fiber; and adjusting, in response to said detecting step, the magnitude of said electric field to maximize said light beam portion.

23. The method of claim 22, wherein said orienting step includes the step of arranging first and second electric fields in a mutually-orthogonal relationship.

24. The method of claim 22, wherein said attaching step includes the step of placing a metallic sleeve over said free end.

25. The method of claim 22, wherein said orienting step includes the steps of:

arranging a set of electrodes about, spaced from and unattached to said capacitance member; and coupling a voltage across said electrode set.

* * * * *